US010808875B2

(12) United States Patent
Lindelof et al.

(10) Patent No.: US 10,808,875 B2
(45) Date of Patent: Oct. 20, 2020

(54) LIGHT HEAD FOR USE IN RELINING PIPES

(71) Applicant: Peanta Inventions AB, Tyreso (SE)

(72) Inventors: Andreas Lindelof, Vendelso (SE); Taus Gerner-Rasmussen, Svedala (SE); Peter Larsson, Sjobo (SE)

(73) Assignee: PEANTA INVENTIONS AB, Alta (SE)

( * ) Notice: Subject to any disclaimer, the term of this patent is extended or adjusted under 35 U.S.C. 154(b) by 148 days.

(21) Appl. No.: 15/490,495

(22) Filed: Apr. 18, 2017

(65) Prior Publication Data

US 2017/0299106 A1  Oct. 19, 2017

(30) Foreign Application Priority Data

Apr. 19, 2016  (SE) ...................................... 1650525

(51) Int. Cl.
*F21V 7/20* (2006.01)
*F16L 55/162* (2006.01)
(Continued)

(52) U.S. Cl.
CPC ............. *F16L 55/162* (2013.01); *F16L 55/18* (2013.01); *F16L 55/40* (2013.01);
(Continued)

(58) Field of Classification Search
CPC ......... F16L 55/162; F16L 55/40; F16L 55/18; F16L 2101/10; F16L 55/1656;
(Continued)

(56) References Cited

U.S. PATENT DOCUMENTS 6,514,346 B1 * 2/2003 Nichols ............... B05B 13/0636
118/254
6,520,719 B1 * 2/2003 Tweedie .................. B29C 63/28
138/97

(Continued)

FOREIGN PATENT DOCUMENTS

| CN | 104154455 A | 11/2014 |
| DE | 19714463 A1 | 11/1997 |
| EP | 2129956 B1 | 12/2009 |

OTHER PUBLICATIONS

Chinese Search Report dated Mar. 9, 2020 for copending Chinese Patent Application No. 201780038101.X.

*Primary Examiner* — William J Carter
*Assistant Examiner* — Omar Rojas Cadima
(74) *Attorney, Agent, or Firm* — Fishman Stewart PLLC (57) ABSTRACT

A light head for use in relining a pipe is disclosed. The light head comprises a proximal end cap, a distal end cap, and at least one body between the proximal end cap and the distal end cap. The proximal end cap also has an air inlet. The body has a longitudinal hole extending from the proximal end cap through the centre of the body towards the distal end cap and at least one air channel extending radially from the longitudinal hole to a radial air outlet. The longitudinal hole is configured to receive air from the air inlet such that in use air from the air inlet passes through the body and exits at the radial air outlet. The body is configured for supporting at least one light emitting diode on the periphery of the body in order to emit light radially from the light head towards the pipe.

16 Claims, 11 Drawing Sheets

(51) Int. Cl.
  *F16L 55/40* (2006.01)
  *F16L 55/18* (2006.01)
  *F16L 101/10* (2006.01)
  *B29C 35/08* (2006.01)
  *F16L 55/165* (2006.01)

(52) U.S. Cl.
  CPC ... *B29C 2035/0827* (2013.01); *F16L 55/1656* (2013.01); *F16L 2101/10* (2013.01)

(58) Field of Classification Search
  CPC .............. F16L 2101/16; F16L 55/1645; F16L 58/1027; B29C 2035/0827; B29C 35/10; B29C 63/34; B29C 65/1406; B05B 13/0636; B08B 9/0495; G03B 37/005; Y10S 118/10
  See application file for complete search history.

(56) References Cited

U.S. PATENT DOCUMENTS

| | | | | |
|---|---|---|---|---|
| 6,645,230 | B2 * | 11/2003 | Whitehurst | A61N 5/0613 607/88 |
| 2010/0051168 | A1 * | 3/2010 | Moeskjaer | F16L 55/165 156/64 |
| 2011/0115358 | A1 * | 5/2011 | Kim | F21V 29/74 313/46 |
| 2014/0268830 | A1 * | 9/2014 | Boyer | F21V 21/14 362/382 |

* cited by examiner

LIGHT HEAD FOR USE IN RELINING PIPES

CROSS-REFERENCE TO RELATED APPLICATIONS

This application claims priority to Swedish Patent Application No. SE 1650525-7, filed on Apr. 19, 2016, the contents of which are hereby incorporated by reference in its entirety.

TECHNICAL FIELD

This invention pertains in general to the field of relining pipes such as kitchen and sewer pipes. More particularly, the invention pertains to a light head for use in relining pipes.

BACKGROUND

Pipelines and piping systems present in sewers and households tend to wear out with time leading to leakage of the fluids flowing therethrough and contamination of the surrounding environment.

Replacement of the pipes may be difficult and expensive in particular where it is necessary to dig up the ground around the pipe such as a sewer pipe or when scaffolding must be erected to facilitate access to a vertical downpipe on a multi-story dwelling. An alternative to replacing pipes is to reline the pipe by inserting a liner through the pipe interior before curing a resin in the liner to facilitate adhesion of the liner to the pipe's interior surface thereby sealing the leaks.

EP 2 129 956 B1 discloses an apparatus and method for curing a liner of a pipeline. On the apparatus's outer wall is a plurality of light emitting diodes (LEDs) for irradiating the liner to cure the resin in the liner as the apparatus moves through the pipe. The inner wall of the apparatus defines a substantially unobstructed through-going passage extending longitudinally between opposite first and second ends. In use the liner is inflated by a supply of pressurized air that enters one end of, and passes through, the apparatus before the air is expelled through the opposing end of the apparatus. The expelled air inflates the liner before being returned to the atmosphere externally of the apparatus. As the pressurized air passes through the apparatus interior it also cools metallic elements that accept heat from the outer LEDs. However, the apparatus of EP 2 129 956 B1 has several light heads connected in series to form an elongated structure that tends to become stuck in a pipe during use. Such elongated structure is also not suitable for use in bent pipes or pipes with right angles. Moreover, the apparatus tends to overheat due to inefficient heat transfer from the outer LEDs to the interior metallic elements where the pressurized air passes through.

It would be desirable to provide an improved light head for use in relining a pipe that addresses the drawbacks and limitations of the prior art.

SUMMARY

Accordingly, the present invention preferably seeks to mitigate, alleviate or eliminate one or more of the above-identified deficiencies in the art and disadvantages singly or in any combination and solves at least the above mentioned problems by providing a light head for use in relining a pipe comprising:
 a proximal end cap with an air inlet;
 a distal end cap;
 at least one body between the proximal end cap and the distal end cap;
 the body having a longitudinal hole extending from the proximal end cap through the centre of the body towards the distal end cap and at least one air channel extending radially from the longitudinal hole to a radial air outlet;
 the longitudinal hole being configured to receive air from the air inlet such that in use air from the air inlet passes through the body and exits at the radial air outlet;
 the body being configured for supporting at least one light emitting diode (LED) on the periphery of the body in order to emit light radially from the light head towards the pipe.

Further advantageous embodiments are disclosed below and in the appended patent claims.

BRIEF DESCRIPTION OF THE DRAWINGS

These and other aspects, features and advantages of which the invention is capable will be apparent and elucidated from the following description of embodiments of the present invention, reference being made to the accompanying drawings, in which.

DETAILED DESCRIPTION

The following description focuses on four embodiments of the present invention applicable to a light head for use in relining a pipe. However, it will be appreciated that the invention is not limited to these embodiments or application.

The following table lists particular features of the light heads and their respective reference numeral as described in the figures.

| Feature | Reference numeral |
|---|---|
| Light head | 100, 200, 300, 400 |
| Proximal end cap | 104, 204, 304, 404 |
| Air inlet | 180, 280, 380, 480 |
| Securing hole | 184, 284, 384, 484 |
| Slot | 486 |
| Spacer | 487 |
| Slip ring | 164 |
| Shaft | 132 |
| Aperture | 136 |
| Body | 112, 212, 312, 412 |
| Longitudinal hole | 116, 216, 316, 416 |
| LED securing hole | 117, 217, 317, 417 |
| Body securing hole | 218, 318, 418 |
| Air channel | 120, 220, 320, 420 |
| Air conduit | 121 |
| Radial air outlet | 124, 224, 324, 424 |
| Longitudinal air passage | 127 |
| Distal air outlet | 128 |
| Trench | 329 |
| Fastening hole for spacer | 430 |
| Fastening hole for return Conductor | 431 |
| Cable hole | 432 |
| LED | 140, 240, 340, 440 |
| Screw | 144, 244, 344 |
| Cable bearer | 441a,b |
| Return conductor | 443a,b |
| Cage | 148, 248, 348, 448 |
| Distal circular member | 152, 252, 352, 452 |
| Proximal circular member | 156, 256, 356, 456 |
| Curved connecting arm | 160, 260, 360, 460 |
| Ring | 168, 268, 368 |
| Longitudinal screw | 369 |
| Flange | 371, 471 |
| Circuit card holder | 473 |
| Circuit card | 474 |
| Camera | 172, 272, 372, 472 |
| Camera chip | 176, 276, 376 |
| PCB chip | 377 |
| Distal end cap | 108, 208, 308, 408 |
| Wing | 188 |
| Securing hole | 192, 292, 392, 492 |
| Sensor hole | 396 |

Figure 10:
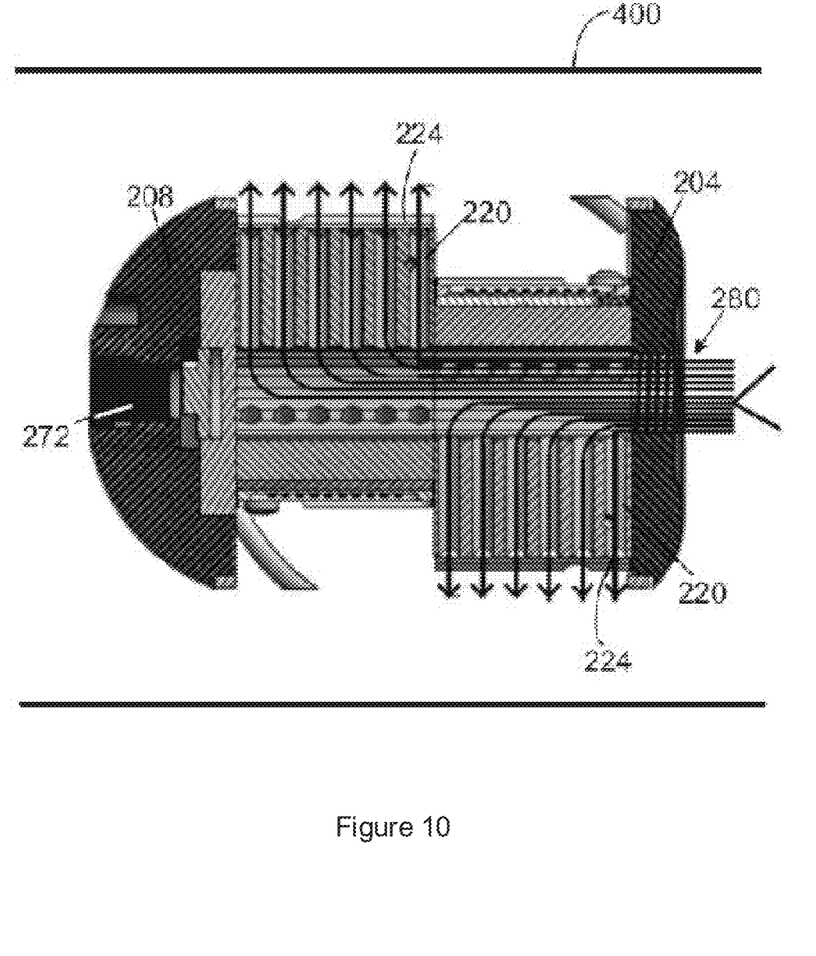
FIG. 10 is a front cross-sectional view along A-A as shown in FIG. 9 of the light head in FIG. 6 wherein the air flow is illustrated by the directional arrows.
Figure 11:
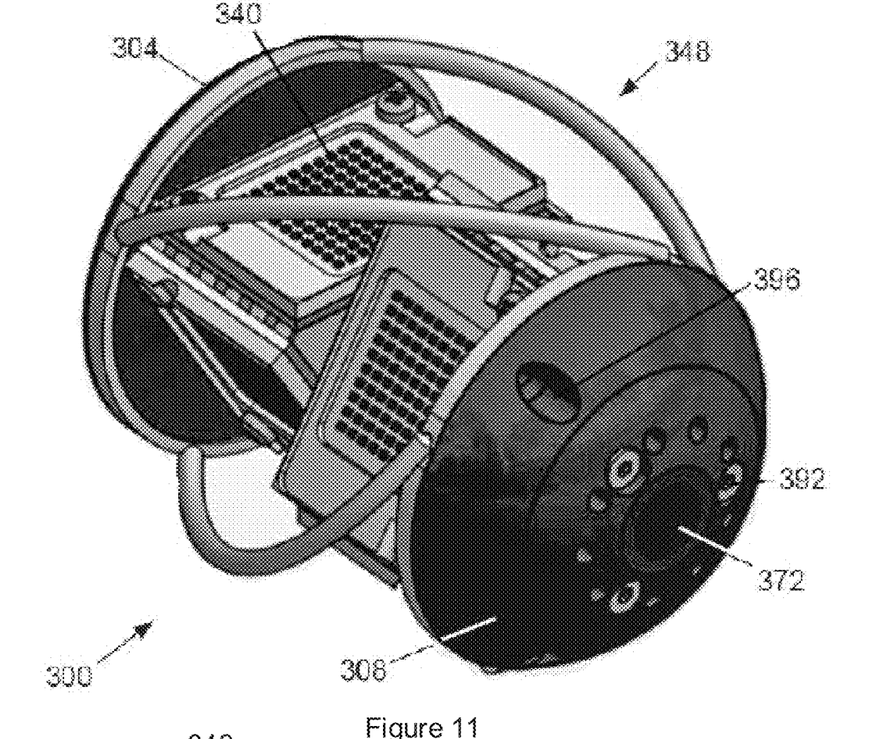
FIG. 11 is a perspective view of a light head according to yet another embodiment of the present invention.
Figure 12A:
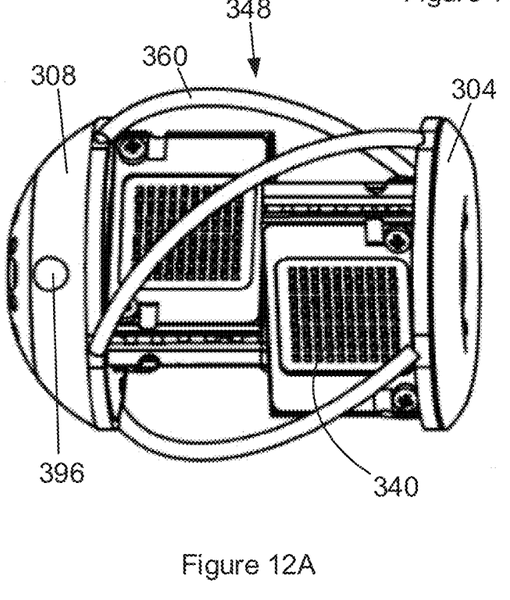
FIG. 12A is a front view of the light head in FIG. 11.
Figure 12B:
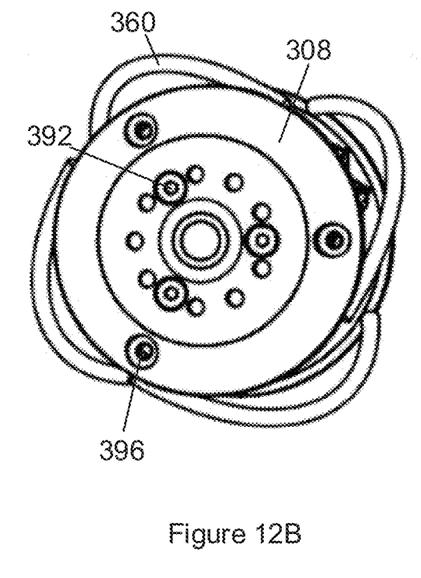
FIG. 12B is a side view of the distal end of the light head in FIG. 11.
Figure 13:
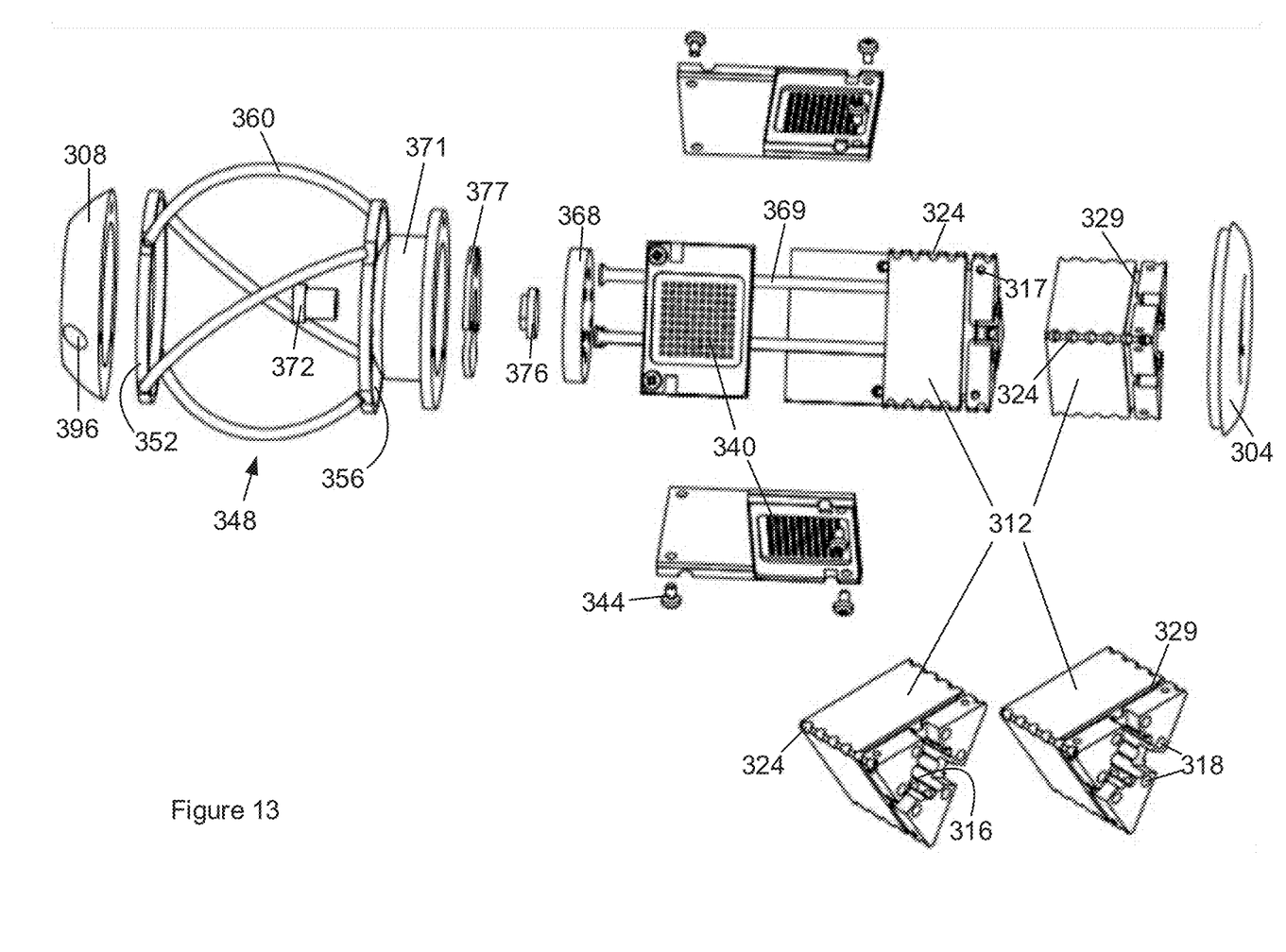
FIG. 13 is an exploded view showing details of the individual parts of the inhaler in FIG. 11.
Figure 14:
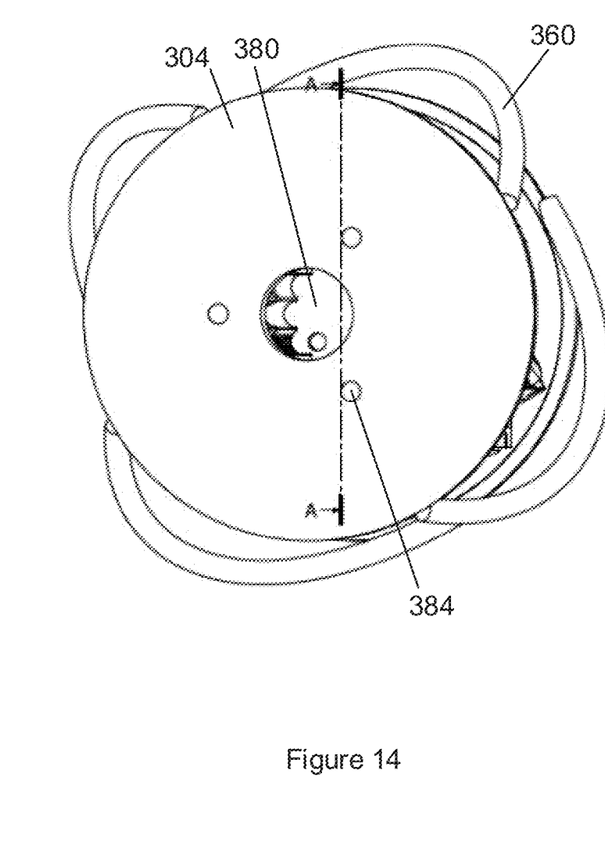
FIG. 14 is a side view of the proximal end of the light head in FIG. 11.
Figure 15:
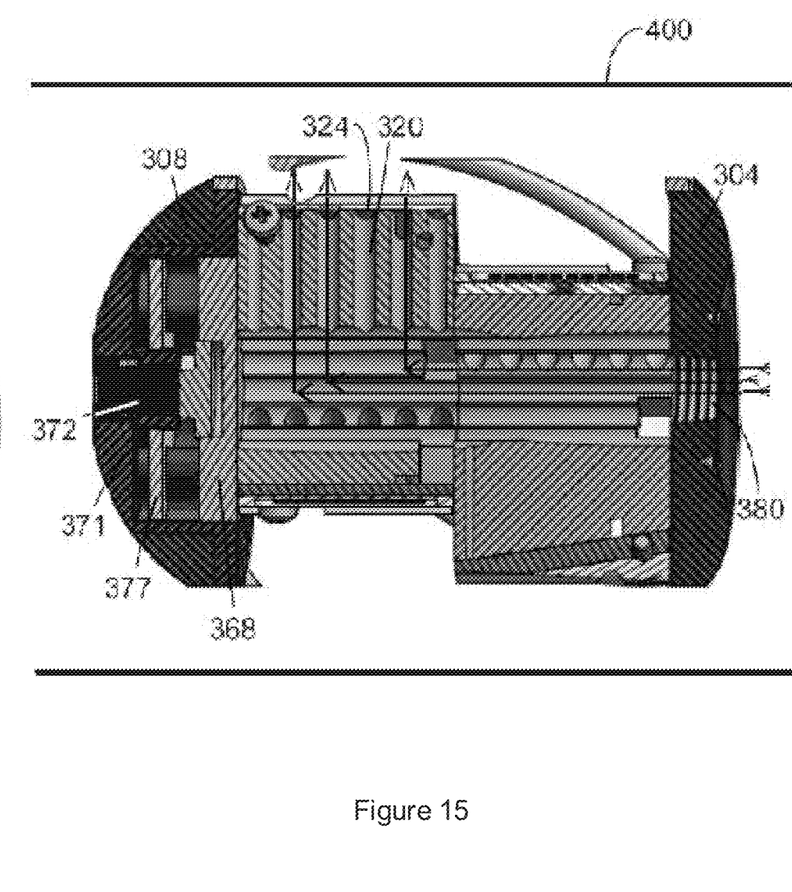
FIG. 15 is a front cross-sectional view along A-A as shown in FIG. 14 of the light head in FIG. 11 wherein the air flow is illustrated by the directional arrows.

As the exemplary light heads 100, 200, 300 and 400 are for use in longitudinal pipes, certain features of the light heads are described with reference to proximal and distal ends which correspond with those of the longitudinal/length direction of a pipe. Other features of the light heads are described using terms such as radial, radially, and radial direction which are intended to imply any direction starting at, or near, the central longitudinal axis of the pipe and moving outwards towards the surface of the pipe (or vice versa i.e. from outwards to at, or near, the inner central longitudinal axis). For example, a radial direction includes the radius of a circular pipe. A pipe 500 is illustrated in FIGS. 5, 10, and 15 for reference purposes.

FIGS. 1 to 5 illustrate a light head 100. The light head 100 has a proximal end cap 104 and a distal end cap 108. The outer diameter of the proximal end cap 104 is 56 mm and the length of the light head 100 is 90 mm. These are exemplary dimensions and may be increased or decreased depending on the size of the pipe 500 to be relined.

Figure 1:
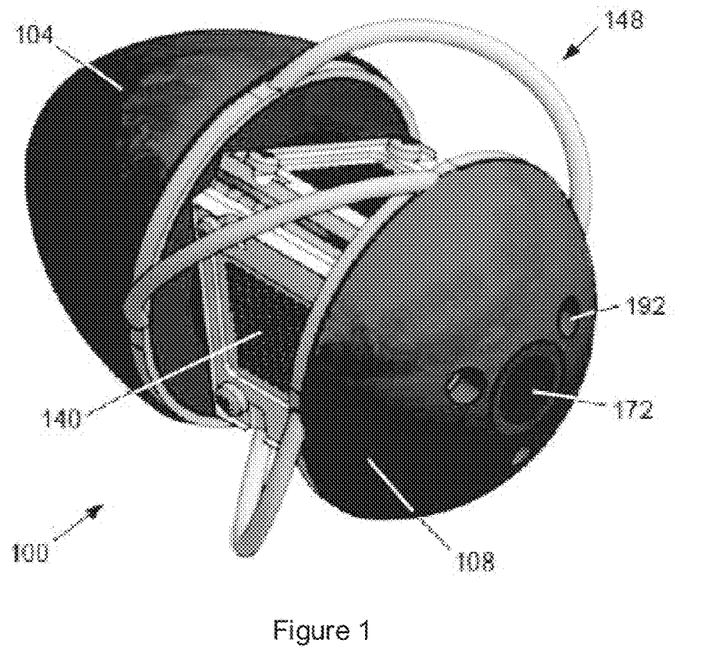
FIG. 1 is a perspective view of a light head according to one embodiment of the present invention.
Figure 2A:
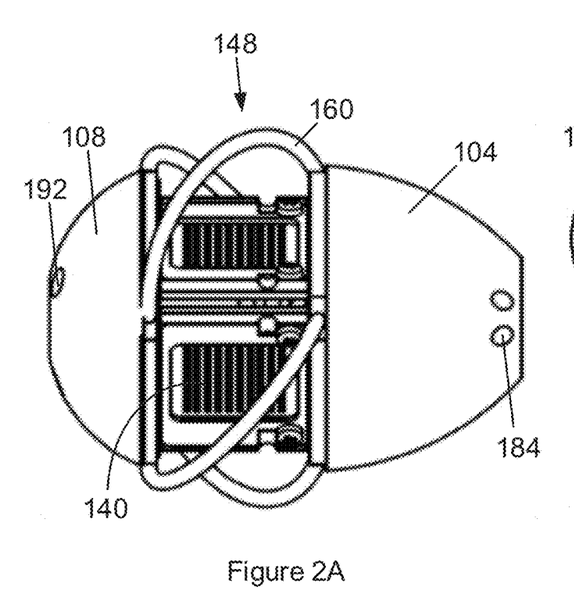
FIG. 2A is a front view of the light head in FIG. 1.
Figure 2B:
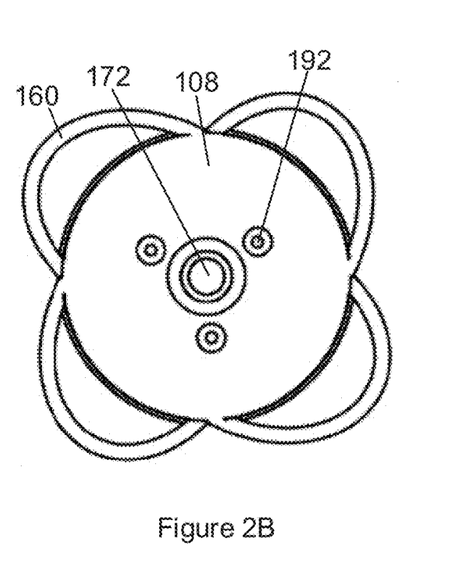
FIG. 2B is a side view of the distal end of the light head in FIG. 1.
Figure 3:
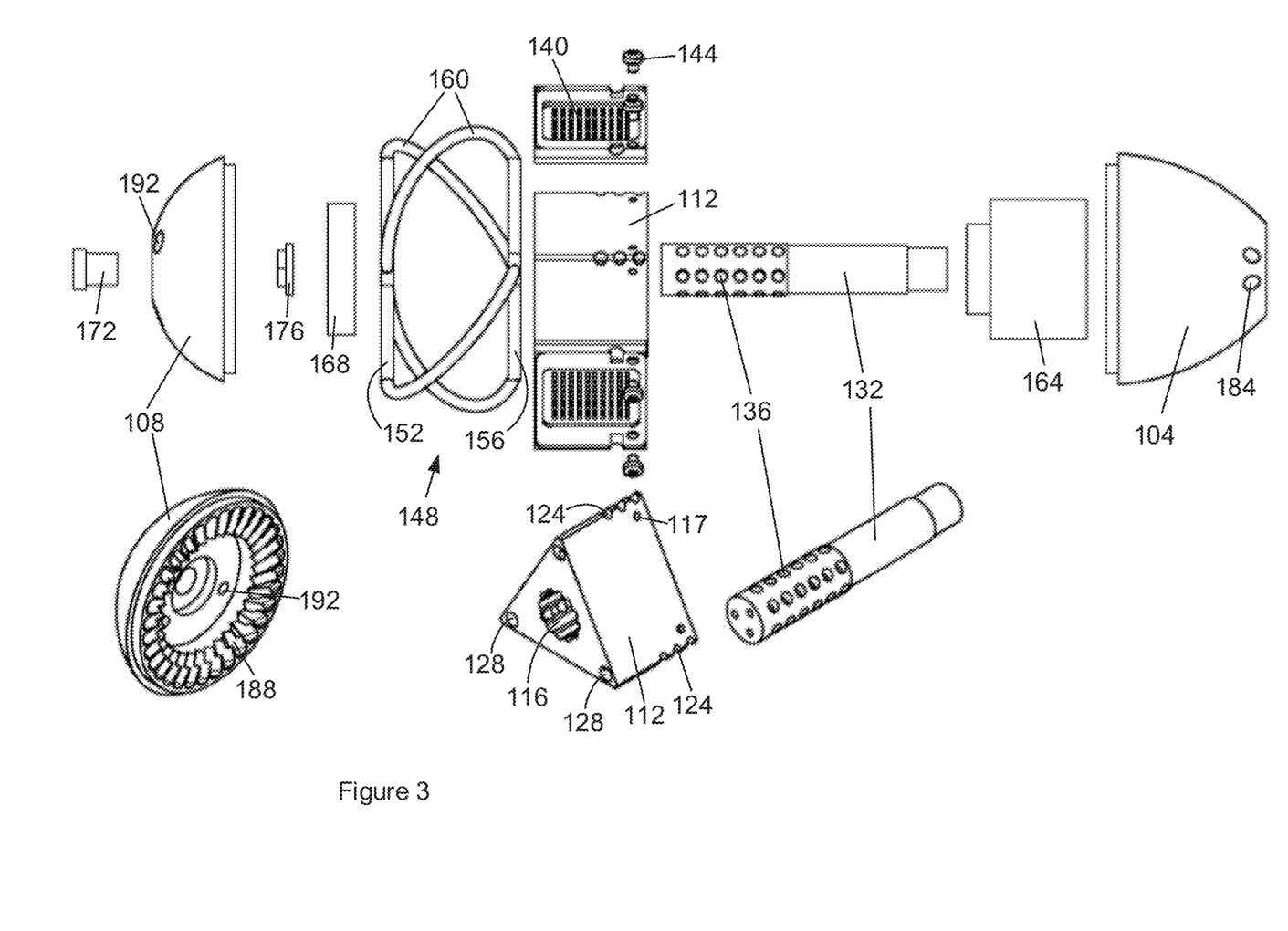
FIG. 3 is an exploded view showing details of the individual parts of the inhaler in FIG. 1.
Figure 4:
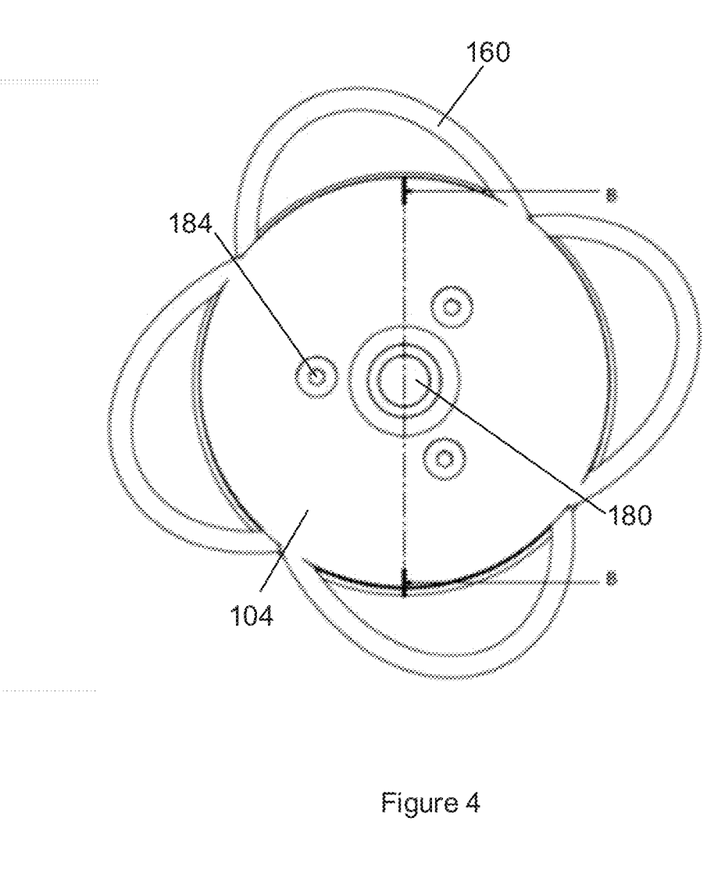
FIG. 4 is a side view of the proximal end of the light head in FIG. 1.
Figure 5:
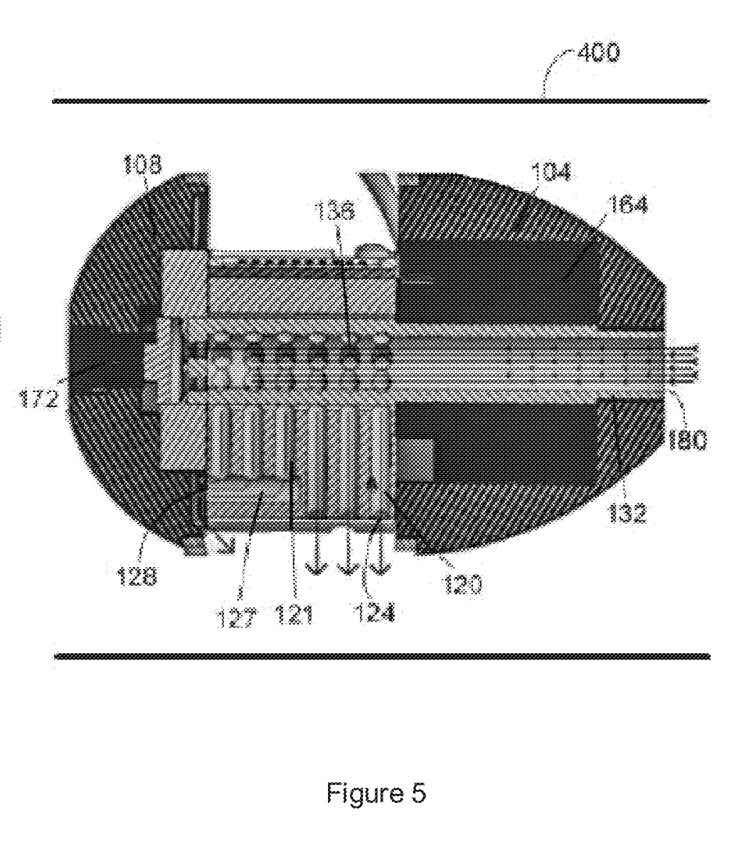
FIG. 5 is a front cross-sectional view along B-B as shown in FIG. 4 of the light head in FIG. 1 wherein the air flow is illustrated by the directional arrows.
Figure 6:
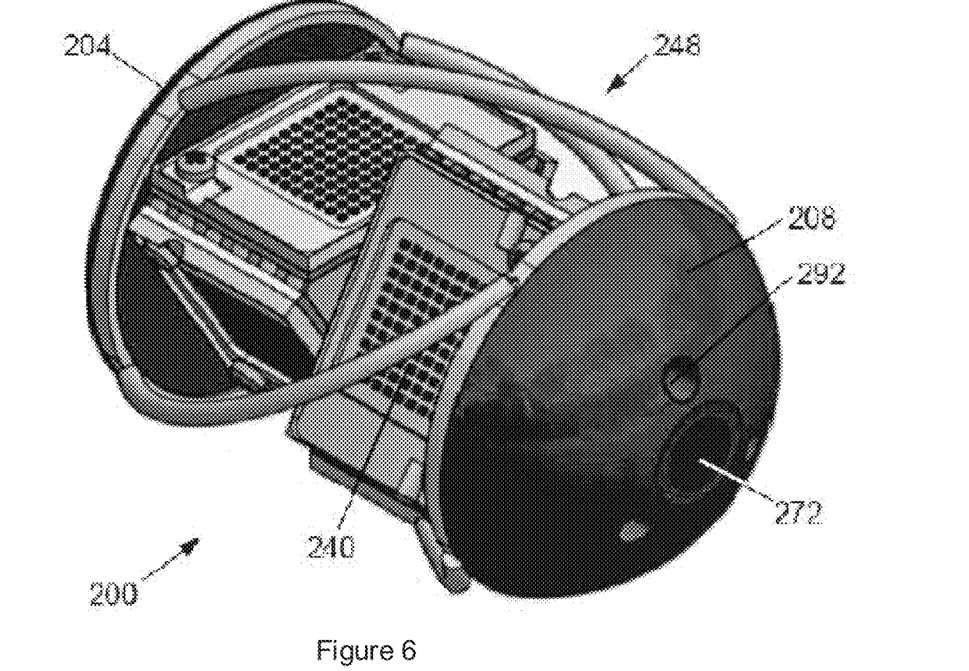
FIG. 6 is a perspective view of a light head according to another embodiment of the present invention.
Figure 7A:
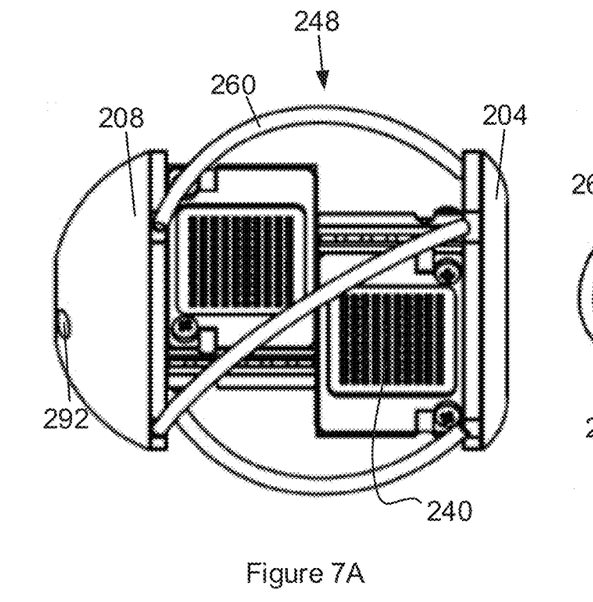
FIG. 7A is a front view of the light head in FIG. 6.
Figure 7B:
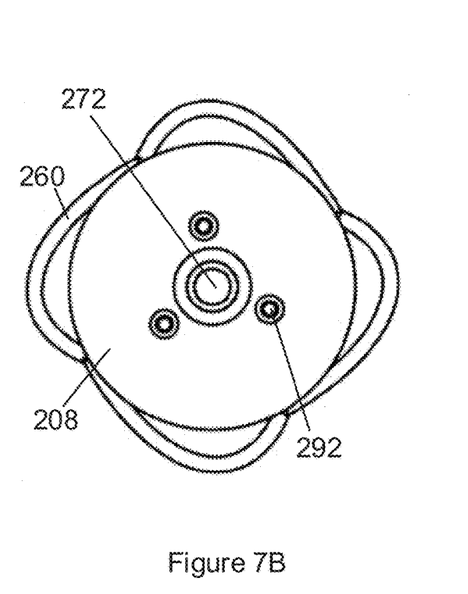
FIG. 7B is a side view of the distal end of the light head in FIG. 6.
Figure 8:
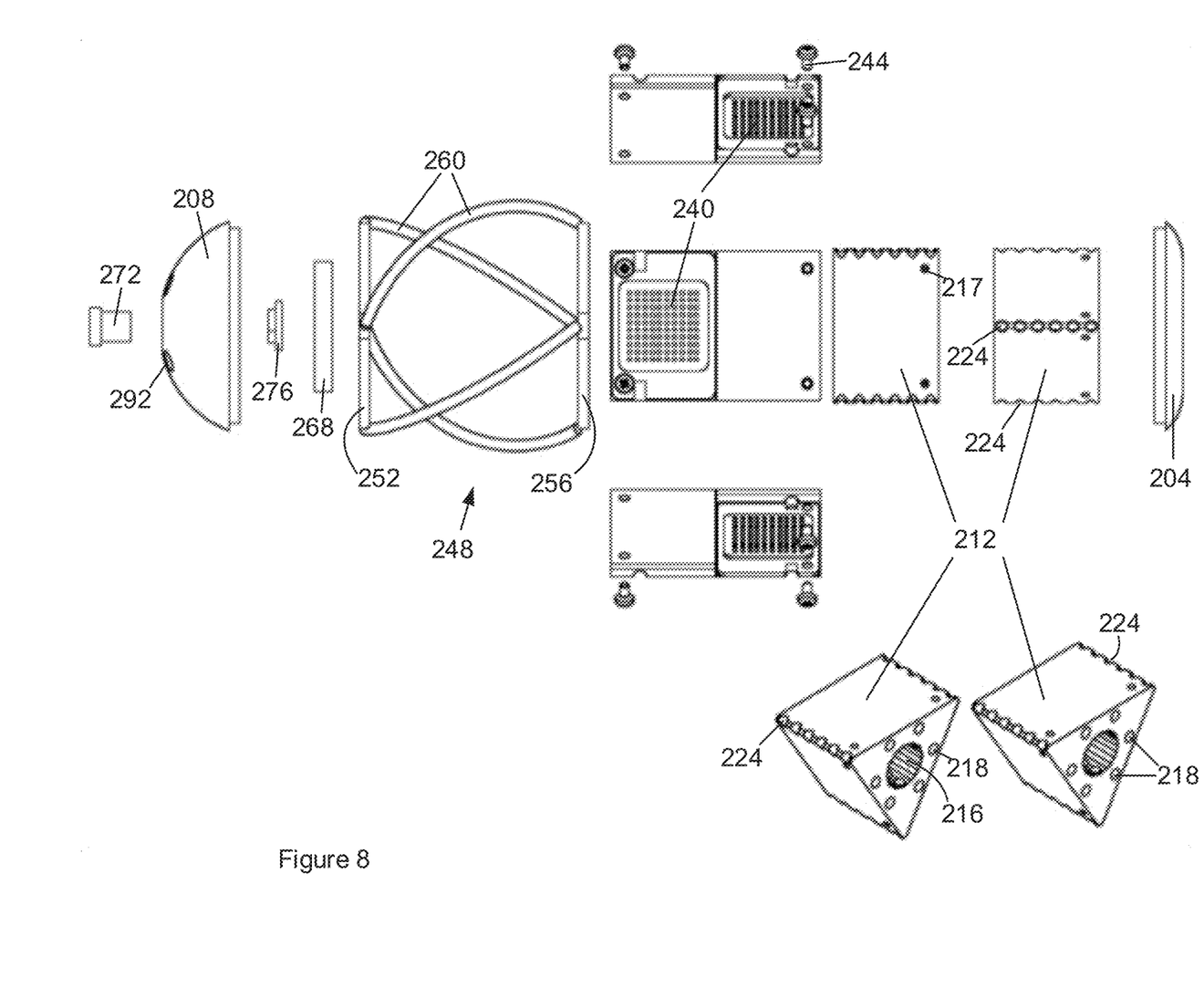
FIG. 8 is an exploded view showing details of the individual parts of the inhaler in FIG. 6.
Figure 9:
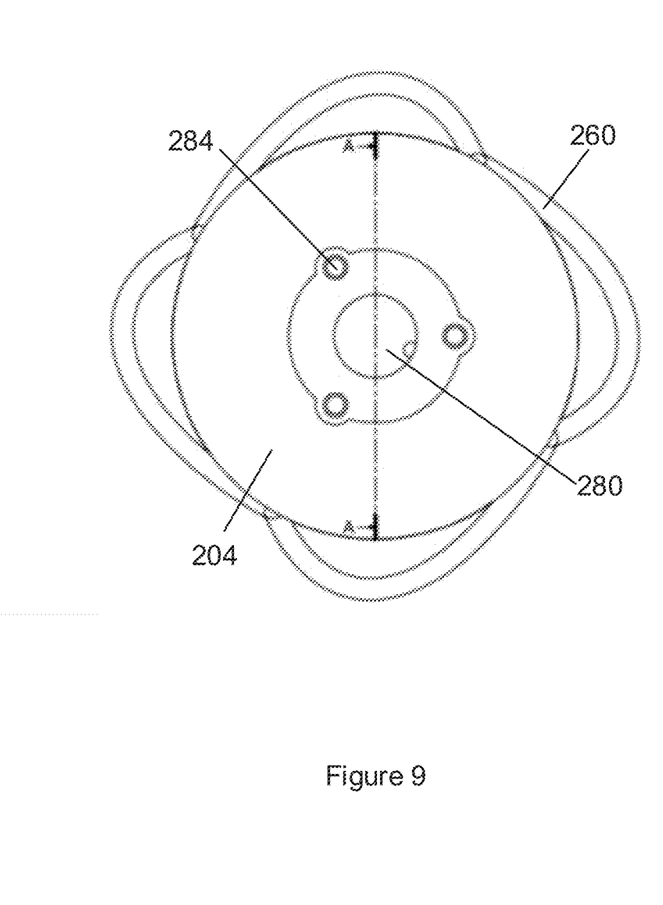
FIG. 9 is a side view of the proximal end of the light head in FIG. 6.

The proximal end cap 104 has an air inlet 180 as best seen in FIG. 5. One or more securing holes 184 on proximal cap 104 are used to secure the cap 104 to a slip ring 164 by use of a standard screw(s).

The distal end cap 108 has a central opening for receiving a camera 172 in a distal portion of the cap 108 that in use allows for inspection and monitoring of the liner (not shown). Camera 172 may have a wide angle lens. A camera chip 176, such as a 700 TVL camera chip, is located proximal to the camera 172. Screws are inserted into securing holes 192 on cap 108 to fasten the cap 108 to a ring 168 located inside a proximal portion of the cap 108. Ring 168 also has a recess for the camera chip 176 and supports a distal end of a shaft 132 as shown in FIG. 5. The shaft 132 will be described below. Radially of the ring 168 but still within a proximal portion of the distal end cap 108 there is a plurality of wings 188 for facilitating rotating/propelling of the body 112 of the light head 100 as will be described below. When the light head 100 is not in use the distal end cap 108 is removable to allow for changing the camera 172, cage 148, and other parts of the light head 100.

A body 112 is positioned between the proximal end cap 104 and the distal end cap 108. Although body 112 is depicted in the shape of a triangular prism, the body may have other three dimensional shapes. Three light emitting diodes (LEDs) 140 are connected to the peripheral surfaces of the body 112 in order that the LEDs are able to emit light radially out to the pipe 500 during use of the light head 100. Of course, only one or two LEDs may be used if desired. The LEDs are typically 100 W but may be up to 200 W. The LEDs may emit light of any suitable wavelength such as between 395-400 nm or 450-455 nm depending on the resin that is to be cured in the liner. Screws 144 are used to fasten the LEDs to LED securing holes 117 on the body 112. An example of a suitable screw 144 is an M2.5 machine screw. Screws 144 may also hold the LED power supply (not shown). A damaged LED 140 is easily removed by removing the screws 144, placing a new LED 140 on the body 112, and then re-fastening the screws 144 into the holes 117.

Body 112 also has a longitudinal hole 116 extending along the central axis of the body 112 from the proximal end cap 104 to the distal end cap 108. The interior surface of the hole 116 has an undulating pattern for minimizing friction and providing for an air bearing in relation to rotation of the body 112 around shaft 132 that will be described below. As shown in FIG. 5, three air channels 120 extend radially from, and perpendicular to, the longitudinal hole 116 to radial air outlets 124. Three air conduits 121 also extend radially from the longitudinal hole 116. The diameter of the channels 120 and conduits 121 may be about 3 mm. Although the three conduits 121 are parallel to air channels 120, they are shorter and lead to a common longitudinal air passage 127 that extends distally to a distal air outlet 128. Due to the three dimensional symmetry of the body 112, there are nine air channels 120, nine air conduits 121, nine radial air outlets 124, three longitudinal air passages 127, and three distal air outlets 128 per body 112. As shown by the arrows in FIG. 5, in use pressurized air enters the air inlet 180 of the proximal end cap 104 and passes through the longitudinal hole 116, air channels 120, air conduits 121, and longitudinal air passages 127 before exiting the radial air outlets 124 and distal air outlets 128. Although some of the air exits the distal air out 128, the air immediately contacts wings 188 of cap 108 resulting in rotation/propelling of the body 112 about its central longitudinal axis. This results in a more homogenous light distribution being shone on the liner and pipe 500. The air is then deflected in a radial or even slightly proximal direction similar to the air exiting the radial air outlets 124.

The light head 100 also has a shaft 132 for supporting the body 112 as well as facilitating rotating/propelling of the body 112 around the shaft 132. The shaft 132 has a plurality of apertures 136 drilled into the shaft 132 at an acute angle, i.e. off center, to further assist in the rotation of the body 112 caused by the air passing therethrough. The apertures 136 are located on the distal portion of the shaft 132 and are received inside the longitudinal hole 116 where they align with the air channels 120 and the air conduits 121. The proximal portion of the shaft 132 is received by the slip ring 164.

A cage 148 surrounds the body 112 and reduces the impact of shadows on the curing process that occurs when light from the LED shines on the liner. The cage 148 has a distal circular member 152, a proximal circular member 156, and four curved connecting arms 160 between the distal circular member 152 and the proximal circular member 156 although the cage 148 may have any suitable number of connecting arms 160 such as between two and seven connecting arms. The connecting arms 160 need not be curved. During use the connecting arms 160 touch the liner thus keeping the body 112 and its LEDs in the center of the pipe 500.

The light head 100 further comprises a hose (not shown) connected to the air inlet 180 for supplying pressurized air to the longitudinal hole 116. The hose may also contain power cables for the LEDs. A vortex cooler (not shown) may also be located proximally of the air inlet 180 for supplying pre-cooled air of about 5 to 6° C. to the light head 100.

It has been surprisingly found that the proximal entrance of air into the longitudinal hole 116 with subsequent passage and exit of the air from the body 112 in a generally radial direction through air channels 120 and radial outlets 124 etc. provides a superior cooling effect thereby avoiding overheating of the body 112 caused by operation of the LEDs on the body's periphery. Indeed it is important that the air entering the air inlet 180 and passing through the longitudinal hole 116 does not continue distally so as to exit the light head 100 distally of the distal end cap 108.

FIGS. 6 to 10 illustrate another light head 200. Unlike light head 100 described above, light head 200 has two bodies 212 between the proximal end cap 204 and the distal end cap 208. In the assembled light head 200 shown in FIGS. 6 and 7A the two bodies 212 are adjacent to each other. It is also possible to have three adjacent bodies 212. In contrast to bodies 112, neither body 212 rotates or is propelled about their central longitudinal axes during use. The bodies 212 are supported by longitudinal screws (not shown) extending through ring 268 and body securing holes 218 on the bodies 212. As shown in cross-sectional FIG. 10, six parallel air channels 220 extend radially from, and perpendicular to, the longitudinal hole 216 to radial air outlets 224. The arrows depict how in use air enters air inlet 280 and flows distally through holes 216 before flowing radially through air channels 220 and exiting air outlets 224. This arrangement of channels 220 and outlets 224 maximises the cooling effect of the air passing through the bodies 212 mentioned above in respect of light head 100. Due to their triangular prismatic symmetry, each body 212 has eighteen air channels 220 and eighteen radial air outlets 224. The two bodies 212 support six LEDs 240 thereby increasing the amount of light irradiated onto the liner (not shown) and pipe 500 relative to light head 100 which only has three LEDs 140. The diameter of the proximal end cap 208 is 56 mm and the length of the light head 200 is 85 mm. Again, these dimensions are provided by way of example and other dimensions of light head 200 may be suitable depending on the application.

FIGS. 11 to 15 illustrate yet another light head 300. Like light head 200, the light head 300 also has two bodies 312 adjacent to each other and between the proximal end cap 304 and the distal end cap 308. The length of the light head 300 is also 85 mm. Unlike bodies 112 in light head 100, the bodies 312 do not rotate about their central longitudinal axes in use. The bodies 312 are supported by longitudinal screws 369 extending through ring 368 and body securing holes 318 on the bodies 312. Each body 312 has eighteen air channels 320. Each air channel 320 extends radially from, and perpendicular to, the longitudinal hole 316 to radial air outlets 324. The arrows again depict the air flow pathway through bodies 312 from air inlet 380 to air outlets 324 that provides the aforementioned cooling effect.

The bodies 312 also have a trench 329 on the periphery of the bodies 312 in which power supply cables for the LEDs 340 may be placed. A sensor hole 396 is provided in distal end cap 208 for a pressure and/or temperature sensor (not shown). During certain applications it may be desirable to measure the pressure in the liner or the temperature of the liner. The distal end cap 308 has an interior recess for receiving a flange 371. A camera 372, printed circuit board (PCB) chip 377, camera chip 376, and ring 368 are located within an interior recess of the flange 371 as best illustrated in FIG. 15. The PCB chip 377 contains a voltage regulator, LEDs for the camera light to see distally into the pipe, and a chip for measuring the liner temperature with infrared and/or the pressure in the liner in conjunction with the sensor, if present.

Figure 16:
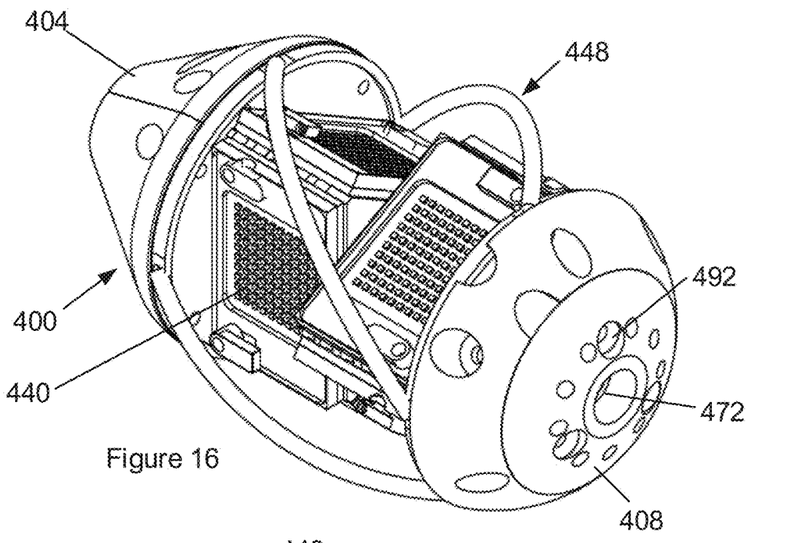
FIG. 16 is a perspective view of a light head according to yet another embodiment of the present invention.
Figure 17A:
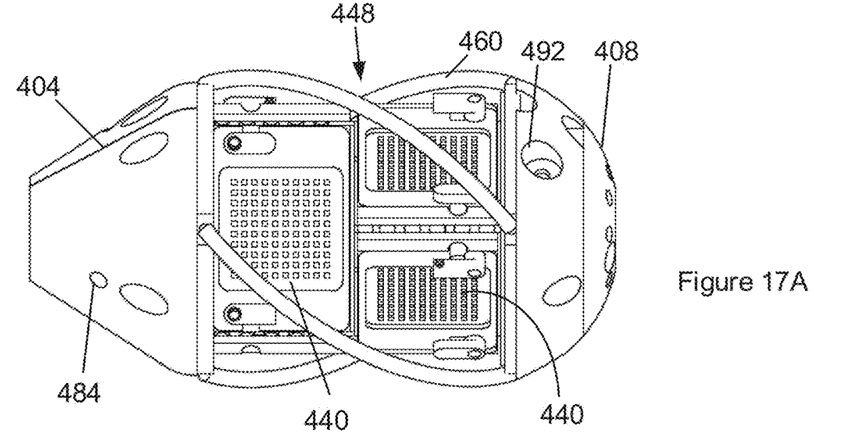
FIG. 17A is a front view of the light head in FIG. 11.
Figure 17B:
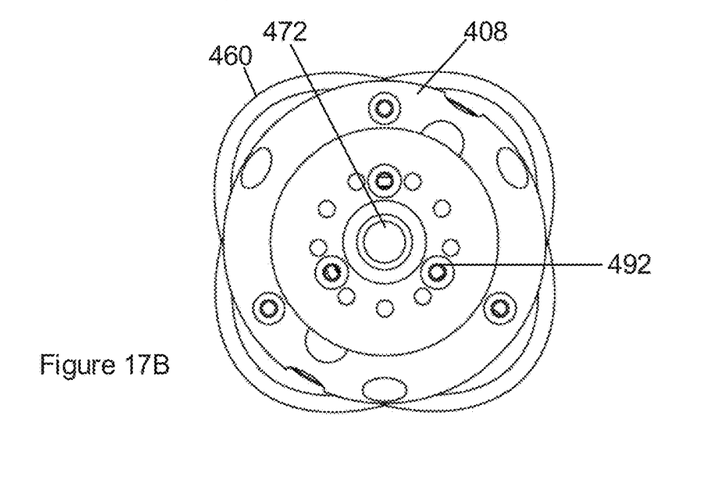
FIG. 17B is a side view of the distal end of the light head in FIG. 11.
Figures 18, 19:
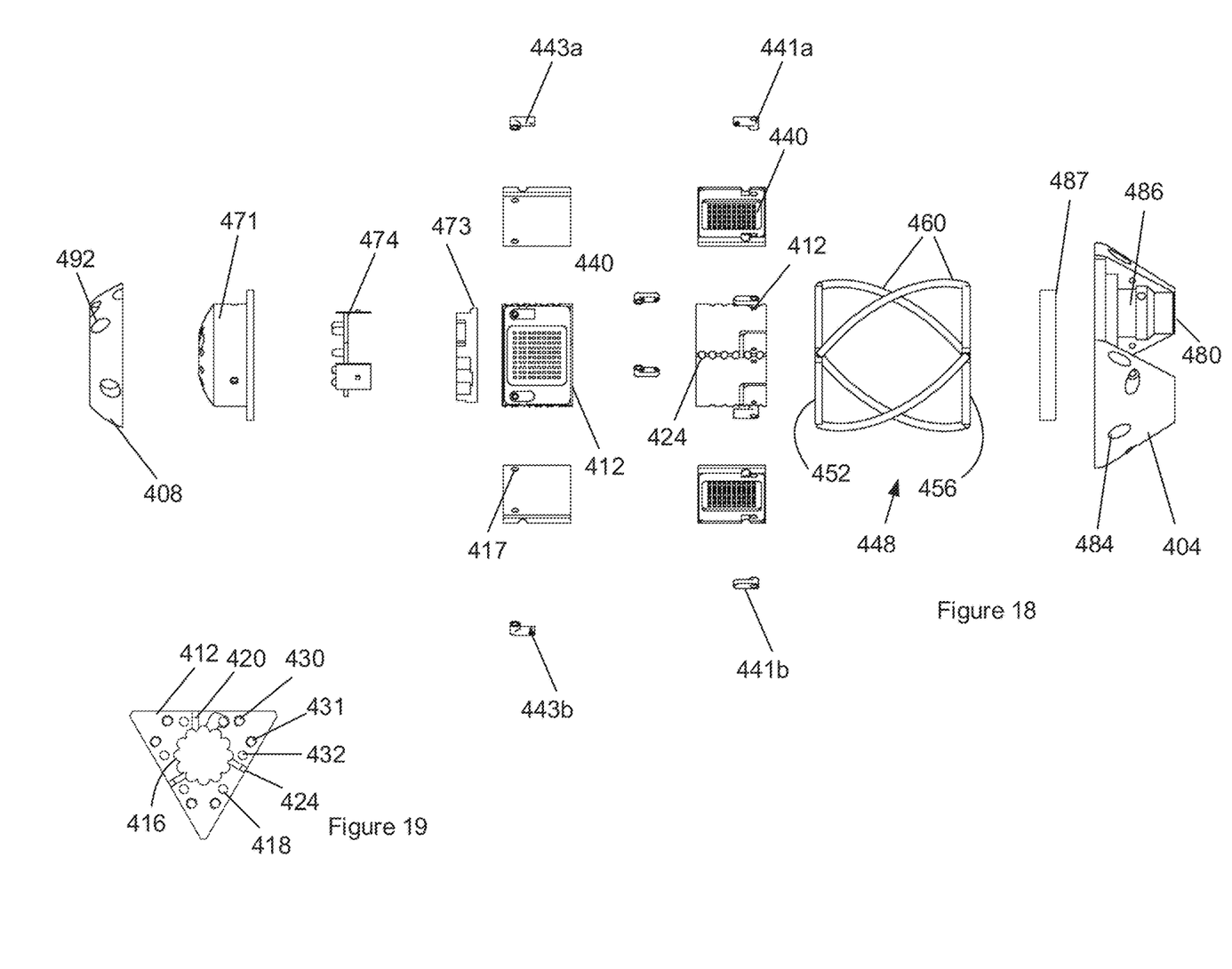
FIG. 18 is an exploded view showing details of the individual parts of the inhaler in FIG. 16.
FIG. 19 is a front view of a body according to the embodiment if FIG. 16.

FIGS. 16 to 18 illustrate yet another light head 400. Like light head 200 according to the second embodiment, this fourth embodiment also has two bodies 412 adjacent to each other and between the proximal end cap 404 and the distal end cap 408. The proximal end cap 404 has a frusto-conical shape which has the advantage that the risk of getting stuck in a curve, say 90 degree curve, is reduced due to the shape. The proximal end cap 404 also allows the light head to be provided with instantaneous couplings for the electricity. In turn this makes it easier for operators on their own to switch the end cap 404 if necessary. The internal of the proximal end cap 404 is further provided with a slot 486 which is arranged to receive a ring or a compression fitting (not shown). Also, the illustrated light head 400 is provided with a spacer 487 to be arranged within the proximal end cap 404.

The bodies 412 are different from the other embodiments such that they can now be used as a return conductor when providing +36V through a clearance hole (not shown) in each body 412, outside the centre. The bodies 412 in this embodiment also has a larger number of threaded and unthreaded holes, such as a fastening hole 430 for the spacer 487, fastening hole 431 for a return conductor 443a, 443b, cable hole 432 and body securing hole 418. The number of holes and the variation of holes may vary.

The light head 400 further includes, connected to the light emitting diodes (LEDs) 440, at least one cable bearer 441a, 441b which is provided with a hole (not shown) for a cable. It also includes at least one return conductor 443a, 443b which is configured to connect the light emitting diodes (LEDs) 440 to the body 412.

Between the lateral end cap 408 and the body 412 closest to the lateral end cap 408 there is provided a circuit card holder 473 and a circuit card 474. They are, in an assembled state, arranged within the flange 471. From the circuit card processes can be controlled, e.g. measuring temperature, liner temperature or pressure. Measured values are processed and transformed in order to control for example the flow of light to the camera.

The light head 400 according to the fourth embodiment can preferably be screwed together, piece by piece, which makes it easier for operators to change the caps 404, 408 or even the entire light head 400.

A skilled person will understand that the LEDs 240 and 340, LED securing holes 217 and 317, screws 244 and 344, cages 248 and 348, rings 268 and 368, cameras 272 and 372, camera chips 276 and 376, and the securing holes 284, 384, 292, and 392 in the end caps 204, 304, 208, and 308 all of which are features of light heads 200 and 300 are similar in design and function to the correspondingly named features of light head 100 as described and recited in the table above. Light heads 200 and 300 may also further comprise a hose (not shown) connected to the air inlets 280 and 380 for supplying pressurized air to the longitudinal holes 216 and 316. The hose may also contain power cables for the LEDs. A vortex cooler (not shown) may also be located proximally of the air inlets 280 and 380 for supplying pre-cooled air of about 5 to 6° C. to the light heads 200 and 300.

In use a liner is inserted into the interior of a pipe that is to be relined. A light head 100, 200, or 300 is then pushed distally all the way through the liner/pipe. An air source is applied to the light heads and the LEDs 140, 240, or 340 are illuminated. The light head is then dragged proximally back through the liner towards the user. Light from the LEDs cure the resin in the liner so the liner adheres to the interior of the pipe to seal the leaks. If a vortex cooler is present proximally of the air inlet 180, 280, or 380, the heat from the vortex cooler effectively pre-heats the liner before the LEDs on the light head pass the pre-heated area. This pre-heating may assist the curing process. The air exiting radially from the light heads not only cools the bodies 112, 212, 312 to avoid overheating but also assist in cooling the heated liner.

The light heads 100, 200, and 300 are small enough for use in kitchen pipes with a diameter of 70 mm, as well as bent pipes, and pipes with narrow angles and right angles. Suitable larger pipes may have diameters of up to 250-300 mm.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A light head for use in relining a pipe comprising:
   a proximal end cap with an air inlet;
   a distal end cap;
   at least one body between the proximal end cap and the distal end cap;
   the body having a longitudinal hole extending from the proximal end cap through the center of the body towards the distal end cap, the body defining at least one air channel extending linearly in a radial direction from the longitudinal hole to a radial air outlet;
   the longitudinal hole being configured to receive air from the air inlet, the distal end cap at least substantially blocking the longitudinal hole such that in use air from the air inlet passes through the body via the longitudinal hole and exits at the radial air outlet;
   the body being configured for supporting at least one light emitting diode (LED) on a periphery of the body in order to emit light radially from the light head towards the pipe.

2. The light head according to claim 1, further comprising a plurality of air channels.

3. The light head according to claim 2, wherein at least one of the air channels is perpendicular to the longitudinal hole.

4. The light head according to claim 1, further comprising at least two air conduits extending radially to a longitudinal air passage within the body, the longitudinal air passage extending distally to a distal air outlet.

5. The light head according to claim 4, further comprising a shaft with a plurality of apertures on a distal end portion of the shaft, the distal end portion of the shaft being receivable by the longitudinal hole and the plurality of apertures being in communication with at least one air channel and the air conduits.

6. The light head according to claim 5, wherein the plurality of apertures have an acute angle to the longitudinal axis of the shaft.

7. The light head according to claim 4, further comprising at least one wing in a proximal portion of the distal end cap, the wing being in communication with the distal air outlet.

8. The light head according to claim 1, comprising at least two bodies between the proximal end cap and the distal end cap.

9. The light head according to claim 8, wherein the bodies have at least one body securing hole extending between the proximal end cap and the distal end cap configured for receiving a longitudinal screw.

10. The light head according to claim 8, wherein the bodies have a trench on the periphery of the bodies.

11. The light head according to claim 1, further comprising a cage surrounding the least one body, the cage having a distal circular member, a proximal circular member, and at least one connecting arm between the distal circular member and the proximal circular member.

12. The light head according to claim 1, further comprising a camera in a distal portion of the distal end cap.

13. The light head according to claim 1, wherein the at least one body has at least one LED securing hole on the periphery of the body configured for receiving a screw.

14. The light head according to claim 1, wherein each body is a triangular prism supporting three light emitting diodes.

15. The light head according to claim 1, further comprising a hose connected to the air inlet for supplying pressurized air to the longitudinal hole.

16. A light head for use in relining a pipe comprising:
   a proximal end cap with an air inlet;
   a distal end cap;
   at least one body between the proximal end cap and the distal end cap;
   the body having a longitudinal hole extending from the proximal end cap through the center of the body towards the distal end cap and at least one air channel extending radially from the longitudinal hole to at least one radial air outlet;

the longitudinal hole being configured to receive air from the air inlet such that at least substantially all of the air from the air inlet passes through the body and completely exits at the at least one radial air outlet;

the body being configured for supporting at least one light emitting diode (LED) on a periphery of the body in order to emit light radially from the light head towards the pipe.

* * * * *